US012782760B2

(12) United States Patent
Wang et al.

(10) Patent No.: US 12,782,760 B2
(45) Date of Patent: Nov. 3, 2026

(54) SEMICONDUCTOR DEVICE INCLUDING SPATIAL LIGHT MODULATOR AND METHOD FOR MANUFACTURING THE SAME

(71) Applicant: TAIWAN SEMICONDUCTOR MANUFACTURING COMPANY, LTD., Hsinchu (TW)

(72) Inventors: Yu-Wen Wang, Hsinchu (TW); Chang-Chih Huang, Hsinchu (TW); Kuo-Chyuan Tzeng, Hsinchu (TW); Han-Yu Chen, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 377 days.

(21) Appl. No.: 18/406,524

(22) Filed: Jan. 8, 2024

(65) Prior Publication Data

US 2025/0224630 A1 Jul. 10, 2025

(51) Int. Cl.
*G02F 1/015* (2006.01)

(52) U.S. Cl.
CPC .................................... *G02F 1/015* (2013.01)

(58) Field of Classification Search
CPC ....................................................... G02F 1/015
USPC .......................................................... 359/240
See application file for complete search history.

(56) References Cited

U.S. PATENT DOCUMENTS

2015/0053331 A1* 2/2015 Tu ......................... G02F 1/1508 156/182
2021/0118830 A1* 4/2021 Huang .................. H10W 72/20
2024/0085728 A1* 3/2024 Reid ..................... G02F 1/1334
2024/0142850 A1* 5/2024 Kim ........................ G02F 1/292
2024/0147874 A1* 5/2024 Cohen .................. H10N 70/063
2024/0395605 A1* 11/2024 Zhang ................. H10W 20/072

* cited by examiner

*Primary Examiner* — Mohammed A Hasan
(74) *Attorney, Agent, or Firm* — Birch, Stewart, Kolasch & Birch, LLP

(57) ABSTRACT

A method for manufacturing a semiconductor device includes: forming a first dielectric layer on a semiconductor substrate; forming a plurality of spaced-apart electrodes in the first dielectric layer; forming a patterned stack on the electrodes opposite to the semiconductor substrate, the patterned stack including a plurality of stack portions spaced apart from each other, each of the stack portions including a heater portion disposed on and connected to at least one of the electrodes and a phase change material portion disposed on the heater portion opposite to the at least one of the electrodes; forming a second dielectric layer to conformally cover the patterned stack; and forming a third dielectric layer on the second dielectric layer, the third dielectric layer being formed with a plurality of air gaps such that the stack portions are spaced apart from each other by the air gaps.

20 Claims, 15 Drawing Sheets

SEMICONDUCTOR DEVICE INCLUDING SPATIAL LIGHT MODULATOR AND METHOD FOR MANUFACTURING THE SAME

BACKGROUND

A spatial light modulator is an optical device which can modulate optical characteristics (e.g., amplitude, phase, or polarization) of a light beam. The spatial light modulator has been widely applied in various fields, such as dynamic holography. Currently, the semiconductor industry strives to improve a process for manufacturing the spatial light modulator, so as to enhance the quality and the device performance of the spatial light modulator.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
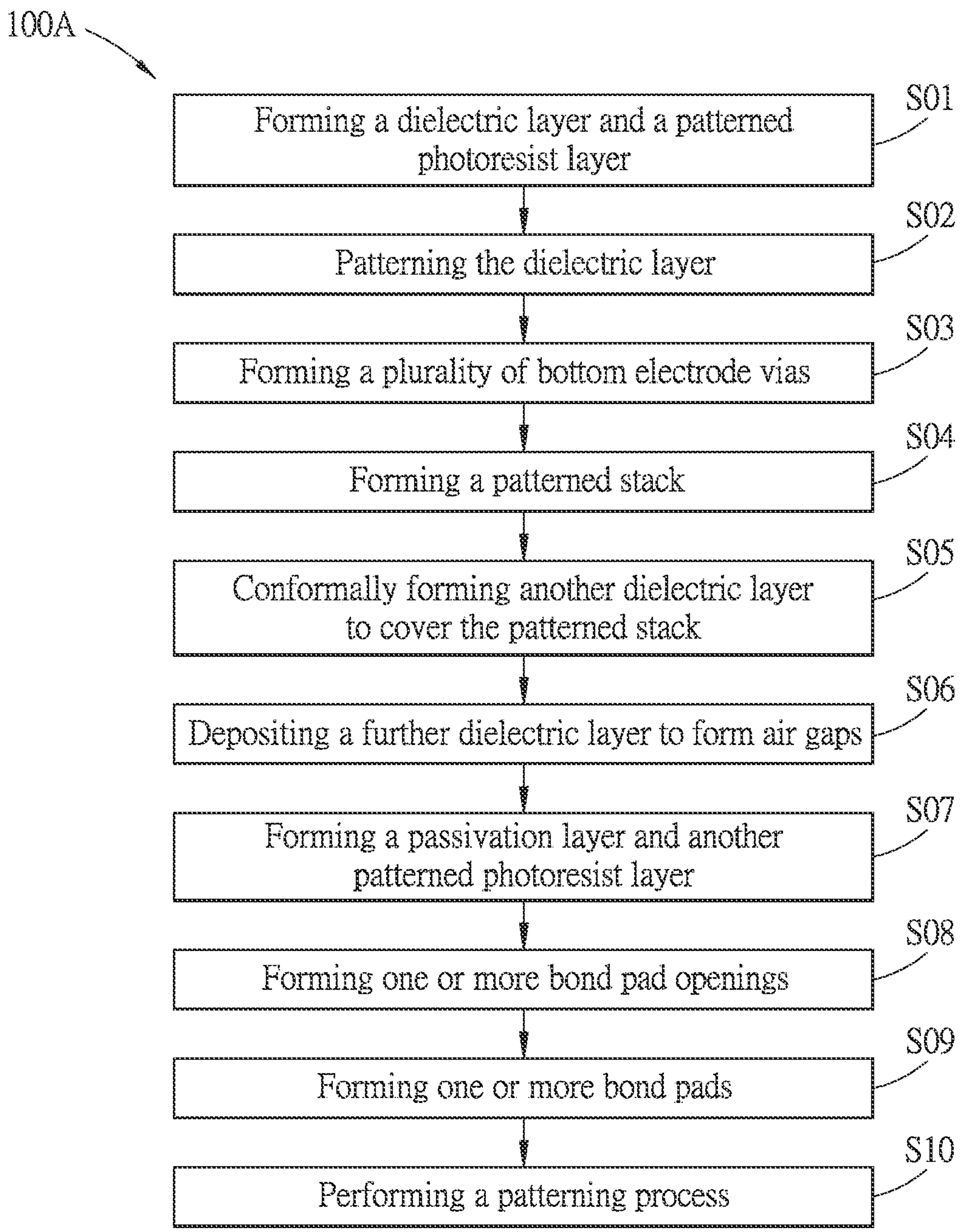
FIGS. 1A and 1B are flow diagrams illustrating a method for manufacturing a semiconductor device including a spatial light modulator in accordance with some embodiments.

The following disclosure provides many different embodiments, or examples, for implementing different features of the disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "on,"" "upper," "lower," "below," "over," and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some aspects ±10%, in some aspects ±5%, in some aspects ±2.5%, in some aspects ±1%, in some aspects ±0.5%, and in some aspects ±0.1% from the specified amount, as such variations are appropriate to perform the disclosed methods or employ the disclosed compositions.

A spatial light modulator is an optical device which can modulate optical characteristics (e.g., amplitude, phase, or polarization) of a light beam. The spatial light modulator has been widely applied in various fields, such as dynamic holography. The spatial light modulator based on micro light-emitting diode (micro LED) technology, micro-electromechanical system (MEMS) technology, or liquid crystal on silicon (LCoS) technology has a limited field-of-view (FOV) (for example, less than) 20° and a low resolution. Currently, the semiconductor industry strives to improve a process for manufacturing the spatial light modulator, so as to enhance the quality and the device performance of the spatial light modulator. The present disclosure is directed to a method for manufacturing a semiconductor device in which a phase change material is used to produce a spatial light modulator with a nanoscale pixel pitch, so as to improve the FOV and the resolution of the spatial light modulator.

Figure 1B:
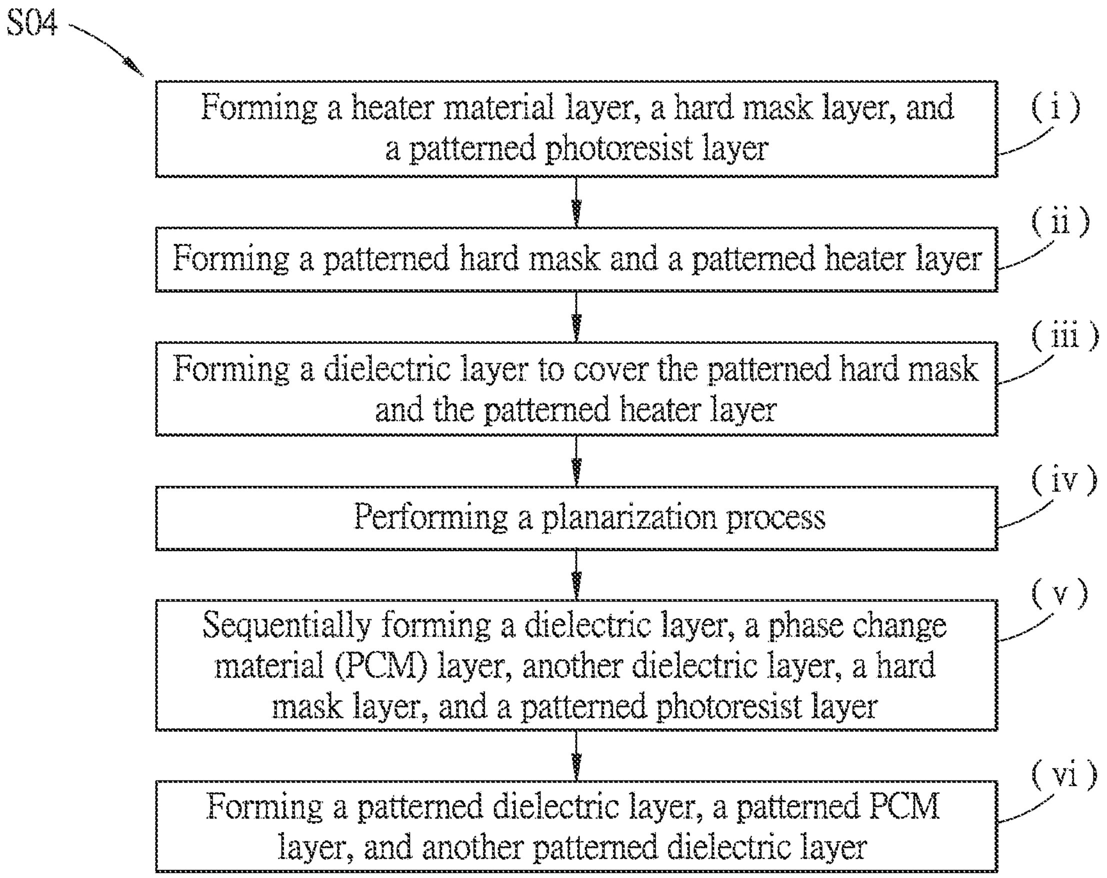

FIGS. 1A and 1B are flow diagrams illustrating a method 100A for manufacturing a semiconductor device (for example, a semiconductor device 200A shown in FIG. 24) in accordance with some embodiments, in which a phase change material is used to produce a spatial light modulator. FIGS. 2 to 25 illustrate schematic views of some intermediate stages of the method 100A in accordance with some embodiments. Some portions may be omitted in FIGS. 2 to 25 for the sake of brevity. Additional steps can be provided before, after or during the method 100A, and some of the steps described herein may be replaced by other steps or be eliminated. Similarly, further additional features may be present in the semiconductor device 200A, and/or features present may be replaced or eliminated in additional embodiments.

Figure 2:
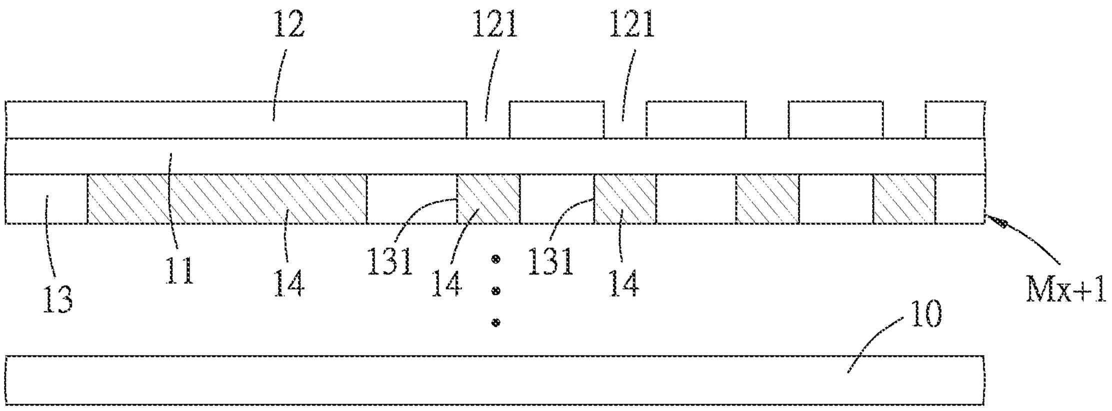
FIGS. 2 to 25 illustrate schematic views of some intermediate stages of the method depicted in FIGS. 1A and 1B in accordance with some embodiments.

Referring to FIG. 1A and the example illustrated in FIG. 2, the method 100A begins at step S01, where a dielectric layer 11 and a patterned photoresist layer 12 are formed. The dielectric layer 11 is formed on a metal layer (Mx+1) which is disposed on a semiconductor substrate 10. The patterned photoresist layer 12 is formed on the dielectric layer 11 opposite to the metal layer (Mx+1).

In some embodiments, the semiconductor substrate 10 may include, for example, but not limited to, an elemental semiconductor or a compound semiconductor. In some embodiments, the elemental semiconductor includes a single species of atoms, such as silicon (Si) or germanium (Ge) in column XIV of the periodic table, and may be in a crystal form, a polycrystalline form, or an amorphous form. Other suitable elemental semiconductor materials are within the contemplated scope of the present disclosure. In some embodiments, the compound semiconductor includes two or more elements, and examples thereof may include, but not limited to, silicon carbide (SiC), gallium arsenide (GaAs), gallium phosphide (GaP), indium phosphide (InP), indium arsenide (InAs), indium antimonide (InSb), silicon germanium (SiGe), gallium arsenide phosphide (GaAsP), aluminum indium arsenide (AlInAs), aluminum gallium arsenide (AlGaAs), gallium indium arsenide (GaInAs), gallium indium phosphide (GaInP), and gallium indium arsenide phosphide (GaInAsP). Other suitable compound semiconductor materials are within the contemplated scope of the present disclosure. The compound semiconductor may have a gradient feature in which the compositional ratio thereof changes from one location to another location therein. The compound semiconductor may be formed over a silicon substrate. The compound semiconductor may be strained. In some embodiments, the semiconductor substrate 10 may include a multilayer compound semiconductor structure. In some embodiments, the semiconductor substrate 10 may be a semiconductor on insulator (SOI) (e.g., silicon germanium on insulator (SGOI)). Generally, an SOI substrate includes a layer of a semiconductor material such as epitaxial silicon, germanium, silicon germanium, or combinations thereof. Other suitable semiconductor materials are within the contemplated scope of the present disclosure. The SOI substrate may be doped with a P-type dopant, for example, but not limited to, boron (Br), aluminum (Al), or gallium (Ga). Other suitable dopant materials are within the contemplated scope of the present disclosure. Alternatively, the SOI substrate may be doped with an N-type dopant, for example, but not limited to, nitrogen (N), phosphorous (P), or arsenic (As). Other suitable dopant materials are within the contemplated scope of the present disclosure. In some embodiments, the semiconductor substrate may further include various active regions, for example, the active regions configured for an N-type metal oxide semiconductor (NMOS) transistor device or the active regions configured for a P-type metal oxide semiconductor (PMOS) transistor device. In some embodiments, the active regions may includes source/drain (S/D) regions of a transistor device. It is noted that each of the source/drain regions may refer to a source or a drain, individually or collectively dependent upon the context.

The metal layer (Mx+1) is disposed on the semiconductor substrate 10, and includes a dielectric layer 13 and a plurality of metal lines 14 disposed in the dielectric layer 13 and spaced apart from each other. In some embodiments, each of the metal lines 14 may include a barrier layer (not shown) conformally formed on a bottom surface and a sidewall surface of a corresponding one of trenches 131 of the dielectric layer 13, a liner layer (not shown) conformally formed on the barrier layer, and a bulk metal portion (not shown) disposed on the liner layer opposite to the barrier layer. In some embodiments, the bulk metal portion may be made of a metal material. In some embodiments, the metal material for forming the bulk metal portion may include, for example, but not limited to, metals (e.g., copper (Cu), silver (Ag), gold (Au), aluminum (Al), nickel (Ni), cobalt (Co), ruthenium (Ru), iridium (Ir), platinum (Pt), palladium (Pd), osmium (Os), tungsten (W), molybdenum (Mo), tantalum (Ta), or the like), alloys thereof possessing promising conductive properties, or the like. Other suitable metal materials are within the contemplated scope of the present disclosure. The liner layer is used to enhance adhesion of the bulk metal portion to the barrier layer. In some embodiments, the liner layer may include, for example, but not limited to, cobalt (Co), ruthenium (Ru), tantalum (Ta), manganese (Mn), or the like, or alloys thereof. Other suitable metal materials are within the contemplated scope of the present disclosure. The barrier layer is used to prevent the metal material of the bulk metal portion from diffusing into the dielectric layer 13. In some embodiments, the barrier layer may include, for example, but not limited to, tantalum (Ta), zinc (Zn), manganese (Mn), zirconium (Zr), titanium (Ti), hafnium (Hf), niobium (Nb), vanadium (V), chromium (Cr), scandium (Sc), yttrium (Y), silicon (Si), tungsten (W), molybdenum (Mo), aluminum (Al), titanium nitride (TiN), titanium tungsten (TiW), tantalum nitride (TaN), tungsten nitride (WN), or combinations thereof. Other suitable materials are within the contemplated scope of the present disclosure. In some embodiments, the metal lines 14 may be made of the metal material without formation of the barrier layer and the liner layer. In some embodiments, the metal layer (Mx+1) is formed by a single damascene process as known to those skilled in the art of semiconductor fabrication.

The dielectric layer 11 is disposed on the metal layer (Mx+1). In some embodiments, the dielectric layer 11 may include a dielectric material, for example, but not limited to, silicon oxide (SiOx), silicon nitride (SiNx), silicon carbide (SiCx), silicon oxycarbide (SiOxCy), silicon oxynitride (SiOxNy), hydrogenated silicon oxycarbide (SiOxCyHz), other low-k dielectric materials, or combinations thereof. Other suitable dielectric materials are within the contemplated scope of the present disclosure. In some embodiments, the dielectric layer 11 may be formed by a suitable deposition process as known to those skilled in the art of semiconductor fabrication, for example, but not limited to, chemical vapor deposition (CVD), physical vapor deposition (PVD), atomic layer deposition (ALD), high density plasma CVD (HDPCVD), remote plasma CVD (RPCVD), plasma enhanced CVD (PECVD), or low-pressure chemical vapor deposition (LPCVD). Other suitable techniques are within the contemplated scope of the present disclosure. A thickness of the dielectric layer 11 is determined based on a critical dimension of bottom electrode vias (BEVAs) 15 to be formed therein, which will be described below with reference to FIG. 8. In some embodiments, the thickness of the dielectric layer 11 ranges from about 200 Å (angstroms) to about 2000 Å.

A photoresist material layer for forming the patterned photoresist layer 12 is then formed on the dielectric layer 11 by a suitable fabrication technique as known to those skilled in the art of semiconductor fabrication, for example, but not limited to, a spin-on technique. Other suitable techniques are within the contemplated scope of the present disclosure. The photoresist material layer is then patterned using a suitable photolithography technique as known to those skilled in the art of semiconductor fabrication to form an opening pattern in the photoresist material layer. The opening pattern includes a plurality of openings 121. For example, the photoresist material layer is soft-baked, exposed through a photomask, post-exposure baked, developed, and hard-baked so as to form the patterned photoresist layer 12, which are formed with the openings 121 therein.

Figure 3:
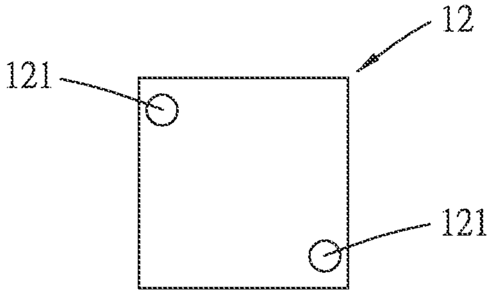
Figure 4:
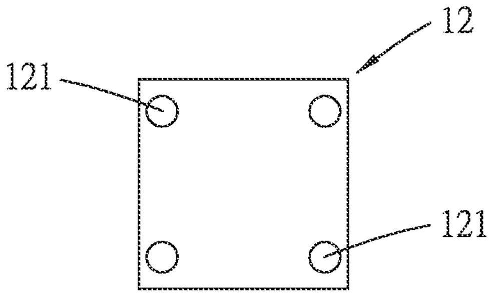
Figure 5:
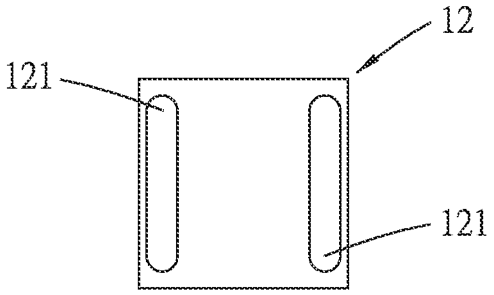

Referring to the examples illustrated in FIGS. 3 to 5, the number, the shape, and the size of the openings 121 in the patterned photoresist layer 12 can be determined based on the number, the shape, and the size of the BEVAs 15 to be formed in the dielectric layer 11. In some embodiments, the patterned photoresist layer 12 may include two openings 121, each of which is configured in a circular cross-sectional shape and which are disposed diagonally from each other in the patterned photoresist layer 12, as shown in FIG. 3. In some embodiments, the patterned photoresist layer 12 may include four openings 121, each of which is configured in a circular cross-sectional shape and which are disposed at four corners of the patterned photoresist layer 12, as shown in FIG. 4. In some embodiments, the patterned photoresist layer 12 may include two openings 121, each of which is configured in an elongated cross-sectional shape and which are spaced apart from each other, as shown in FIG. 5.

Figure 6:
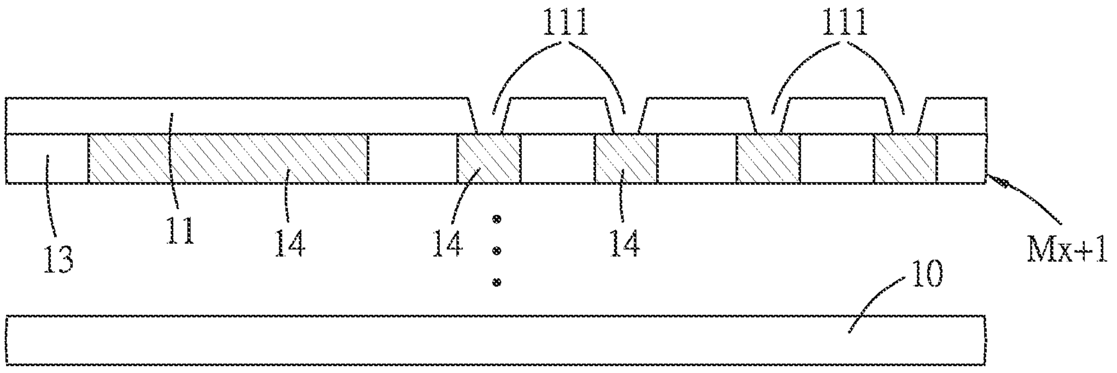

Referring to FIG. 1A and the example illustrated in FIG. 6, the method 100A proceeds to step S02, where the dielectric layer 11 is patterned. The dielectric layer 11 is patterned by a suitable etching process as known to those skilled in the art of semiconductor fabrication, for example, but not limited to, dry etching, wet etching, a combination thereof, or other suitable etching processes, through the openings 121 of the patterned photoresist layer 12 so as to form a plurality of trenches 111 in the dielectric layer 11, thereby permitting corresponding ones of the metal lines 14 to be exposed through the trenches 111, respectively. The patterned photoresist layer 12 (see FIG. 2) is removed by a suitable removal technique (for example, but not limited to, a plasma treatment) after the dielectric layer 11 is patterned.

Figure 7:
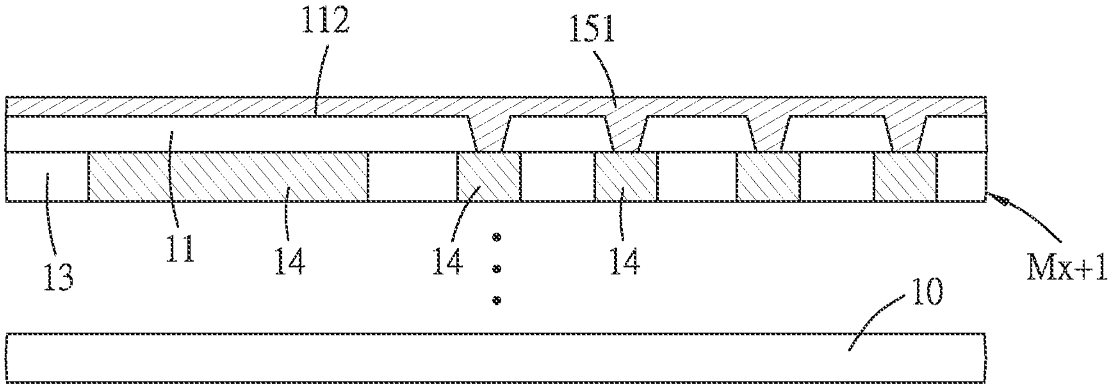
Figure 8:
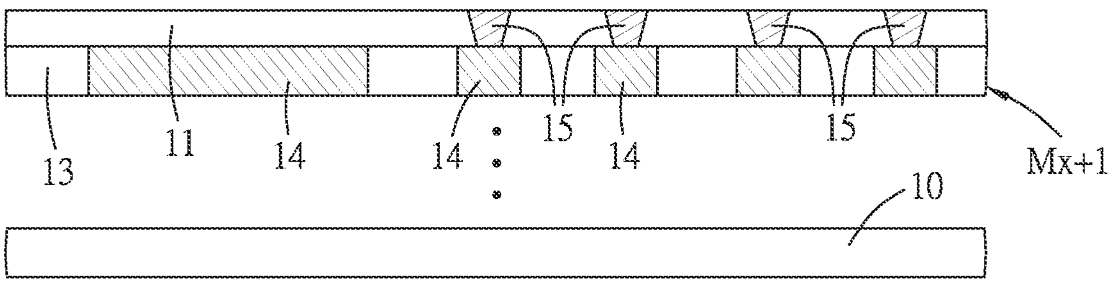

Referring to FIG. 1A and the examples illustrated in FIGS. 7 and 8, the method 100A proceeds to step S03, where a plurality of the BEVAs 15 are formed. Referring the example shown in FIG. 7, an electrode material layer 151 for forming the BEVAs 15 is deposited on the dielectric layer 11 to fill the trenches 111 (see FIG. 6) by a suitable deposition process as known to those skilled in the art of semiconductor fabrication, for example, but not limited to, CVD, PVD, ALD, or other suitable deposition processes. An excess portion of the electrode material layer 151 on an upper surface 112 of the dielectric layer 11 is removed by a planarization process as known to those skilled in the art of semiconductor fabrication (e.g., chemical mechanical planarization (CMP) or other suitable planarization processes) so as to form a plurality of the BEVAs 15 in the dielectric layer 11. In some embodiments, The electrode material layer 151 for forming the BEVAs 15 may include, for example, but not limited to, copper (Cu), gold (Au), titanium (Ti), tantalum (Ta), platinum (Pt), tungsten (W), titanium nitride (TiN), aluminum copper (AlCu), tantalum nitride (TaN), tungsten nitride (WN), or combinations thereof. Other suitable materials for the electrode material layer 151 are within the contemplated scope of the present disclosure. The BEVAs 15 are electrically connected to the metal lines 14 of the metal layer (Mx+1), respectively.

Referring to FIGS. 1A and 1B and the examples illustrated in FIGS. 9 to 18, the method 100A proceeds to step S04, where a patterned stack 29 (see FIG. 18) is formed. Step S04 includes sub-steps (i) to (vi) shown in FIG. 1B and described below.

Figure 9:
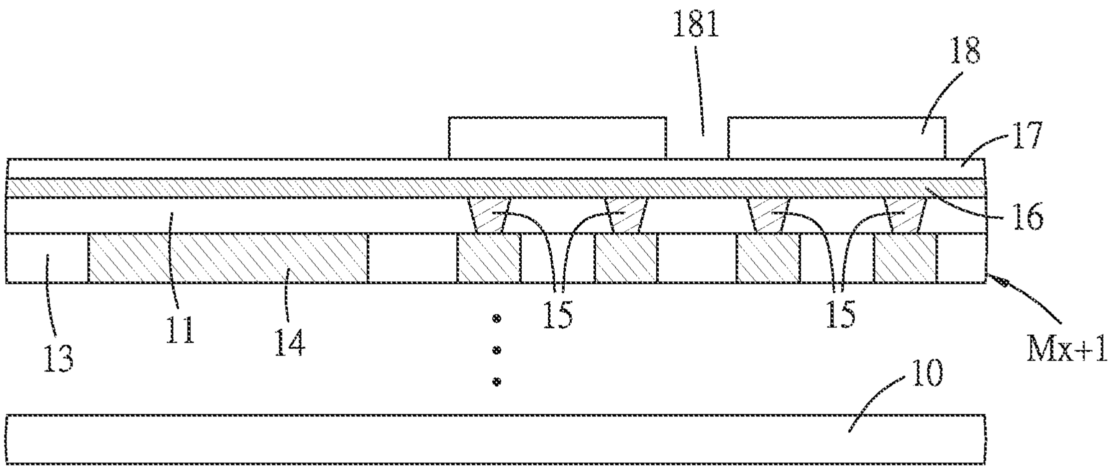

Referring to FIG. 1B and the example illustrated in FIG. 9, in sub-step (i), a heater material layer 16, a hard mask layer 17, and a patterned photoresist layer 18 are formed on the BEVAs 15. The heater material layer 16 is formed on the dielectric layer 11 and the BEVAs 15 opposite to the metal layer (Mx+1). The hard mask layer 17 is formed on the heater material layer 16 opposite to the dielectric layer 11 and the BEVAs 15. The patterned photoresist layer 18 is formed on the hard mask layer 17 opposite to the heater material layer 16. In some embodiments, the heater material layer 16 may include a metal material having a melting point higher than about 1500 K. In some embodiments, the heater material layer 16 includes, for example, but not limited to, copper (Cu), tungsten (W), titanium nitride (TiN), aluminum copper (AlCu), tantalum nitride (TaN), or combinations thereof. Other suitable metal materials for the heater material layer 16 are within the contemplated scope of the present disclosure. In some embodiments, the heater material layer 16 has a thickness ranging from about 100 Å to 1000 Å. If the thickness of the heater material layer 16 is less than 100 Å, the voltage for operating a spatial light modulator to be subsequently formed will increase undesirably. In some embodiments, the heater material layer 16 is formed on the dielectric layer 11 and the BEVAs 15 by a suitable deposition process as known to those skilled in the art of semiconductor fabrication, for example, but not limited to, CVD, PVD, ALD, or other suitable deposition processes. Other suitable techniques are within the contemplated scope of the present disclosure.

In some embodiments, the hard mask layer 17 may include a dielectric material, for example, but not limited to, silicon oxide (SiOx), silicon nitride (SiNx), silicon carbide (SiCx), silicon oxycarbide (SiOxCy), silicon oxynitride (SiOxNy), or combinations thereof. Other suitable materials are within the contemplated scope of the present disclosure. In some embodiments, the hard mask layer 17 may be formed by a suitable deposition process as known to those skilled in the art of semiconductor fabrication, for example, but not limited to, CVD, PVD, ALD, HDPCVD, RPCVD, PECVD, or LPCVD. Other suitable techniques are within the contemplated scope of the present disclosure.

In some embodiments, the patterned photoresist layer 18 is formed with one or more openings 181. One of the openings 181 is shown in FIG. 9. The patterned photoresist layer 18 may be formed on the hard mask layer 17 using the materials and processes for forming the patterned photoresist layer 12 described above with reference to FIG. 2, and thus details thereof are omitted for the sake of brevity.

Figure 10:
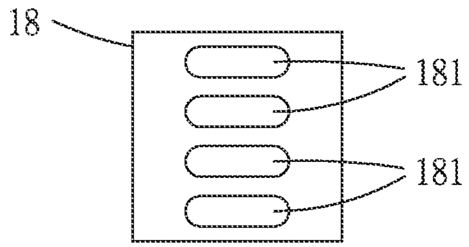
Figure 11:
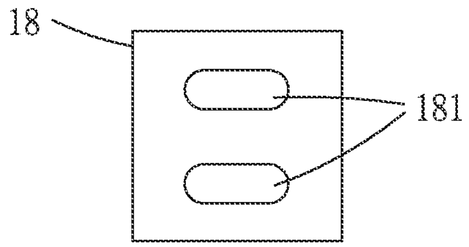
Figure 12:
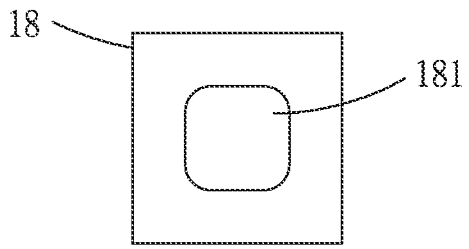

Referring to the examples illustrated in FIGS. 10 to 12, the number, the shape, and the size of the one or more openings 181 in the patterned photoresist layer 18 can be optimized so as to obtain a uniform thermal profile for different sizes of pixels of a spatial light modulator to be subsequently formed. In some embodiments, the patterned photoresist layer 18 may include four openings 181, each of which is configured in an elongated cross-sectional shape and which are spaced apart from each other, as shown in FIG. 10. In some embodiments, the patterned photoresist layer 18 may include two openings 181, each of which is configured in an elongated cross-sectional shape and which are spaced apart from each other, as shown in FIG. 11. In some embodiments, the patterned photoresist layer 18 may include a single opening 181, which is configured in a shape of a square cross-section with four rounded corners, as shown in FIG. 12.

Figure 13:
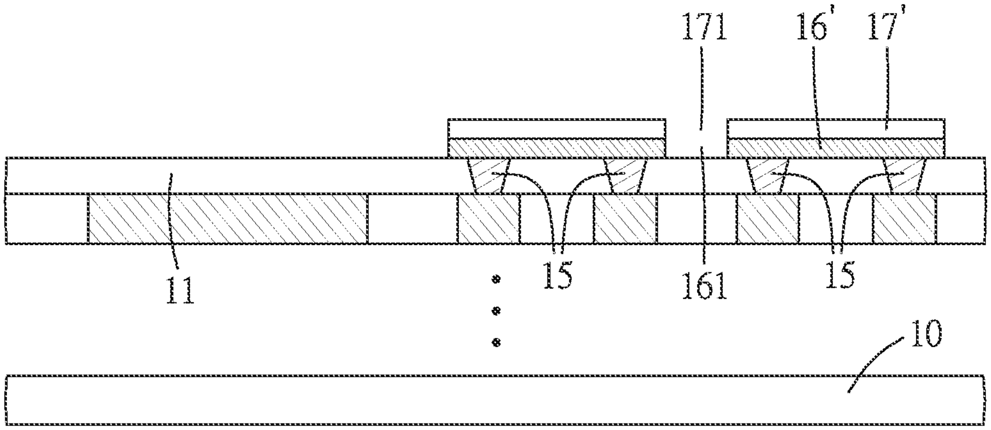

Referring to FIG. 1B and the example illustrated in FIG. 13, in sub-step (ii), a patterned hard mask 17' and a patterned heater layer 16' are formed. The hard mask layer 17 of the structure shown in FIG. 9 is patterned by a suitable etching process as known to those skilled in the art of semiconductor fabrication, for example, but not limited to, dry etching, wet etching, a combination thereof, or other suitable etching processes, through the one or more openings 181 of the patterned photoresist layer 18 so as to transfer the pattern of the one or more openings 181 of the patterned photoresist layer 18 to the hard mask layer 147, thereby forming the patterned hard mask 17' with a pattern of one or more openings 171. One of the openings 171 is shown in FIG. 13. The heater material layer 16 of the structure shown in FIG. 9 is patterned by a suitable etching process as known to those skilled in the art of semiconductor fabrication, for example, but not limited to, dry etching, wet etching, a combination thereof, or other suitable etching processes, through the one or more openings 171 of the patterned hard mask 17' so as to form the patterned heater layer 16' having one or more openings 161 in spatial communication with the one or more openings 171 of the patterned hard mask 17', respectively. One of the openings 161 is shown in FIG. 13. The patterned photoresist layer 18 (see FIG. 9) is removed by a suitable removal technique (for example, but not limited to, a plasma treatment) after the patterned hard mask 17' is formed and before the heater material layer 16 is patterned, or after both of the patterned hard mask 17' and the patterned heater layer 16' are formed.

Figure 14:
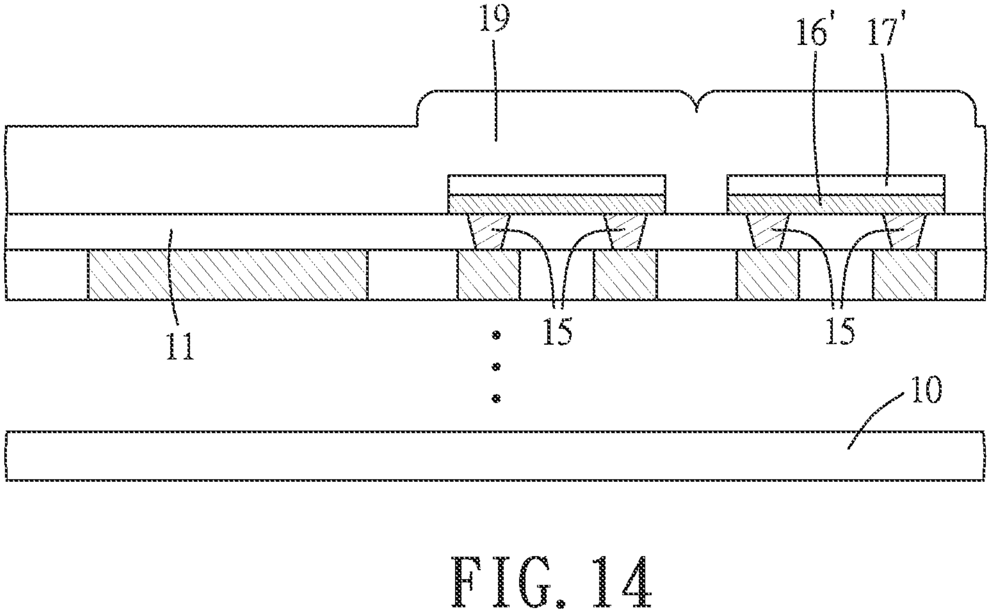

Referring to FIG. 1B and the example illustrated in FIG. 14, in sub-step (iii), a dielectric layer 19 is formed to cover the patterned hard mask 17' and the patterned heater layer 16'. The dielectric layer 19 is formed on the structure shown in FIG. 13 to cover the patterned hard mask 17' and the patterned heater layer 16' and to fill the one or more openings 171 of the patterned hard mask 17' and the one or more openings 161 of the patterned heater layer 16'. The dielectric layer 19 may be formed using the materials and the processes for forming the dielectric layer 11 described above with reference to FIG. 2, and thus details thereof are omitted for the sake of brevity. In some embodiments, the dielectric layer 19 includes silicon oxide (SiOx), other low-k dielectric materials, or combinations thereof.

Figure 15:
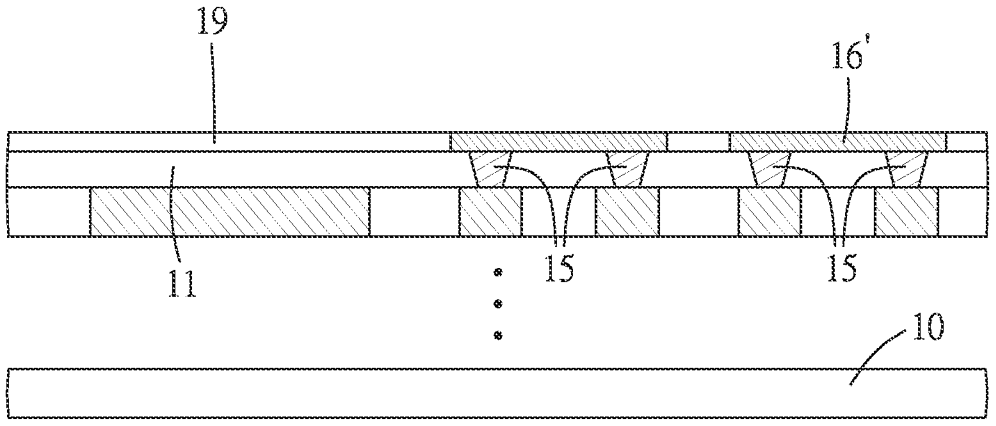
Figure 16:
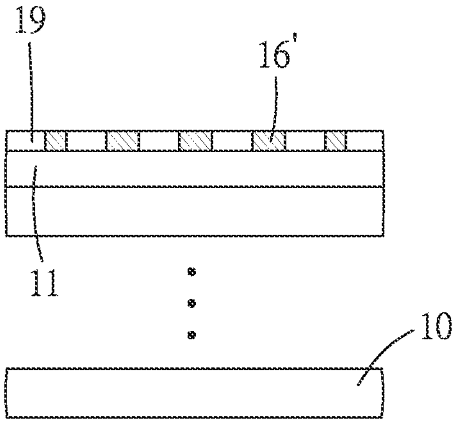

Referring to FIG. 1B and the examples illustrated in FIGS. 15 and 16, in sub-step (iv), a planarization process is performed. A planarization process as known to those skilled in the art of semiconductor fabrication (for example, but not limited to, CMP or other suitable planarization processes) is performed on the structure shown in FIG. 14 to remove a portion of the dielectric layer 19 and the patterned hard mask 17'. The planarization process stops at the patterned heater layer 16' to expose the patterned heater layer 16', such that the patterned heater layer 16' is disposed in remainder of the dielectric layer 19.

Figure 17:
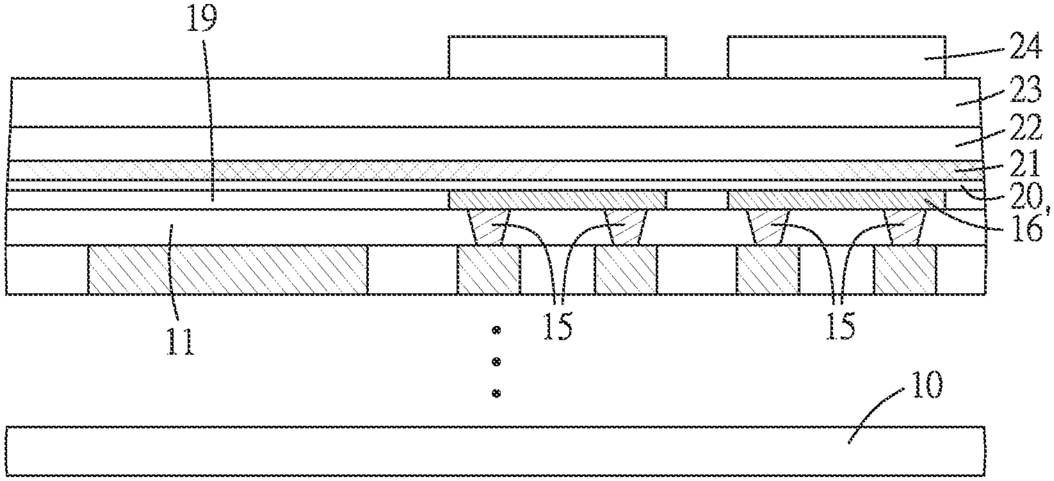

Referring to FIG. 1B and the example illustrated in FIG. 17, in sub-step (v), a dielectric layer 20, a phase change material (PCM) layer 21, a dielectric layer 22, a hard mask layer 23, and a patterned photoresist layer 24 are sequentially formed on the patterned heater layer 16' and the remainder of the dielectric layer 19 of the structure shown in FIGS. 15 and 16. In some embodiments, the dielectric layer 20 may be formed using the materials and processes for forming the dielectric layer 11 described above with reference to FIG. 2, and thus details thereof are omitted for the sake of brevity. In some embodiments, the dielectric layer 20 has a thickness ranging from about 50 Å to about 300 Å. In some embodiments, the PCM layer 21 includes a phase change material, for example, but not limited to, germanium telluride (GeTe), germanium-antimony-telluride (GeSbTe), germanium-indium-antimony-telluride (GeInSbTe), or combinations thereof. Other suitable phase change materials are within the contemplated scope of the present disclosure. In some embodiments, the PCM layer 21 is light-transmissive. In some embodiments, the PCM layer 21 has a thickness ranging from about 50 Å to about 300 Å. In some embodiments, the PCM layer 21 may be formed on the dielectric layer 20 by a suitable deposition process as known to those skilled in the art of semiconductor fabrication, for example, but not limited to, CVD, PVD, ALD, HDPCVD, RPCVD, PECVD, or LPCVD. Other suitable techniques are within the contemplated scope of the present disclosure. In some embodiments, the dielectric layer 22 may be formed on the PCM layer 21 using the materials and processes for forming the dielectric layer 11 described above with reference to FIG. 2, and thus details thereof are omitted for the sake of brevity. In some embodiments, the dielectric layer 22 has a thickness ranging from about 50 Å to about 300 Å. In some embodiments, the dielectric layer 22 is light-transmissive. The hard mask layer 23 may be formed on the dielectric layer 22 using the materials and processes for forming the hard mask layer 17 described above with reference to FIG. 9, and thus details thereof are omitted for the sake of brevity. In some embodiments, the patterned photoresist layer 24 may be formed on the hard mask layer 23 using the materials and processes for forming the patterned photoresist layer 12 described above with reference to FIG. 2, and thus details thereof are omitted for the sake of brevity. The patterned photoresist layer 24 is used to define the size of the pixels of the spatial light modulator to be subsequently formed.

Figure 18:
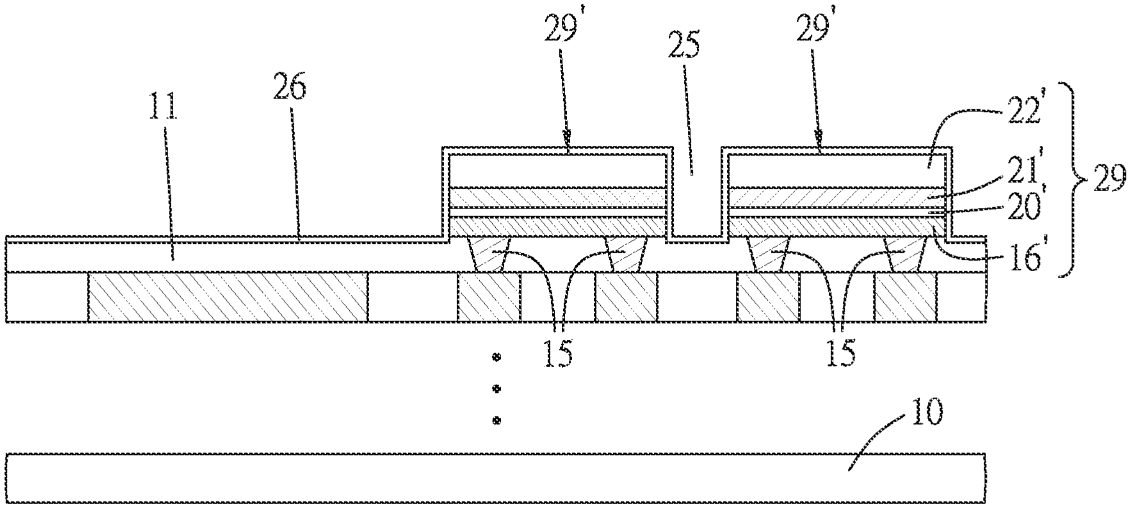

Referring to FIG. 1B and the example illustrated in FIG. 18, in sub-step (vi), a patterned dielectric layer 22', a patterned PCM layer 21', and a patterned dielectric layer 20' are formed. The patterned dielectric layer 22', the patterned PCM layer 21', the patterned dielectric layer 20', and the patterned heater layer 16' are collectively referred to as the patterned stack 29, which includes a plurality of stack portions 29' spaced apart from each other. Two of the stack portions 29' are shown in FIG. 18. The patterned dielectric layer 20' is disposed below the patterned PCM layer 21' and is referred to as a lower patterned dielectric layer. The patterned dielectric layer 22' is disposed on the patterned PCM layer 21' opposite to the patterned dielectric layer 20' and is referred to as an upper patterned dielectric layer. The hard mask layer 23 of the structure shown in FIG. 17 is patterned by a suitable etching process as known to those skilled in the art of semiconductor fabrication, for example, but not limited to, dry etching, wet etching, a combination thereof, or other suitable etching processes, through the patterned photoresist layer 24 to form a patterned hard mask (not shown). The dielectric layer 22, the PCM layer 21, the dielectric layer 20, and the remainder of the dielectric layer 19 are patterned by one or more suitable etching processes as known to those skilled in the art of semiconductor fabrication, for example, but not limited to, dry etching, wet etching, a combination thereof, or other suitable etching processes, through the patterned hard mask so as to expose portions of the dielectric layer 11 through one or more openings 25 which extend through the dielectric layer 22, the PCM layer 21, the dielectric layer 20, and the patterned heater layer 16' and so as to form the patterned dielectric layer 22', the patterned PCM layer 21', and the patterned dielectric layer 20'. The patterned photoresist layer 24 (see FIG. 17) can be removed by a suitable removal technique (for example, but not limited to, a plasma treatment) after the patterned hard mask is formed and before the dielectric layer 22, the PCM layer 21, the dielectric layer 20, and the remainder of the dielectric layer 19 are patterned, or after the patterned dielectric layer 22', the patterned PCM layer 21', and the patterned dielectric layer 20' are formed. The patterned hard mask can be removed by a suitable removal technique (for example, but not limited to, an etching back process) after the patterned dielectric layer 22', the patterned PCM layer 21', and the patterned dielectric layer 20' are formed.

Referring to FIG. 1A and the example illustrated in FIG. 18, the method 100A proceeds to step S05, where a dielectric layer 26 is conformally formed to cover the patterned stack 29. The dielectric layer 26 is conformally formed to cover the dielectric layer 11 and the patterned stack 29 by a suitable deposition process as known to those skilled in the art of semiconductor fabrication, for example, but not limited to, CVD, PVD, ALD, HDPCVD, RPCVD, PECVD, or LPCVD. Other suitable techniques are within the contemplated scope of the present disclosure. In some embodiments, the dielectric layer 26 is light-transmissive. In some embodiments, the dielectric layer 26 includes for example, but not limited to, silicon oxide (SiOx), silicon nitride (SiNx), silicon carbide (SiCx), silicon oxycarbide (SiOxCy), silicon oxynitride (SiOxNy), hydrogenated silicon oxycarbide (SiOxCyHz), other low-k dielectric materials, or combinations thereof. Other suitable materials are within the contemplated scope of the present disclosure.

Figure 19:
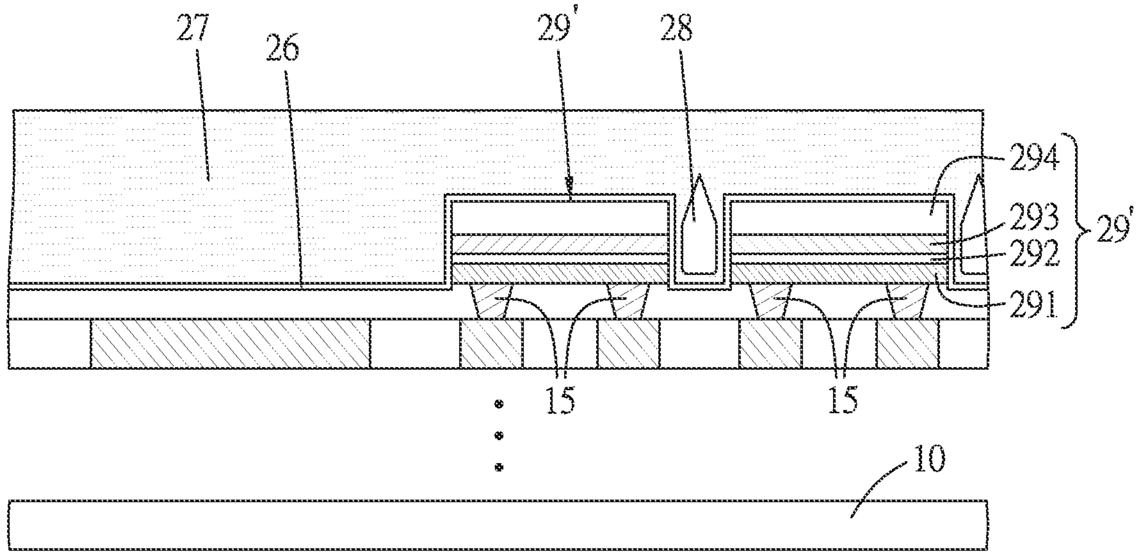

Referring to FIG. 1A and the example illustrated in FIG. 19, the method 100A proceeds to step S06, where a dielectric layer 27 is formed on the structure shown in FIG. 18 using the materials and the processes described above for forming the dielectric layer 11 with reference to FIG. 2, such that a plurality of air gaps 28 are formed in the dielectric layer 27. In some embodiments, the dielectric layer 27 is light-transmissive. The stack portions 29' are spaced apart from each other by the air gaps 28. Each of the stack portions 29' is configured as one of the pixels shown in FIGS. 24 and 25. Therefore, each of the pixels is also denoted by the reference numeral 29'. Each of the stack portions 29' includes a heater portion 291 disposed on and electrically connected to at least one of the BEVAs 15, a first dielectric spacer 292 disposed on the heater portion 191 opposite to the BEVAs 15, a PCM portion 293 disposed on the first dielectric spacer 292 opposite to the heater portion 291, and a second dielectric spacer 294 disposed on the PCM portion 293 opposite to the first dielectric spacer 292. The heater portion 291 is a portion of the patterned heater layer 16', the first dielectric spacer 292 is a portion of the patterned dielectric layer 20', the PCM portion 293 is a portion of the patterned PCM layer 21', and the second dielectric spacer 294 is a portion of the patterned dielectric layer 22'.

Figure 20:
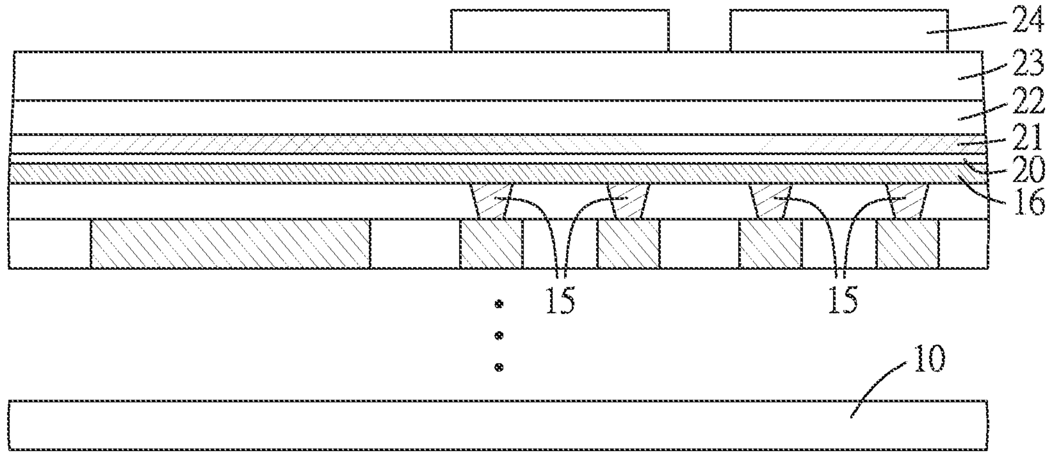

Referring to the example illustrated in FIG. 20, in some embodiments, the patterned stack 29 of the structure shown in FIG. 18 can be formed by sequentially forming the heater material layer 16, the dielectric layer 20, the PCM layer 21, the dielectric layer 22, the hard mask layer 23, and the patterned photoresist layer 24 on the structure shown in FIG. 8 using the materials and processes described above, and then patterning the hard mask layer 23, the dielectric layer 22, the PCM layer 21, the dielectric layer 20, and the heater material layer 16 using processes the same as or similar to those described above.

Figure 21:
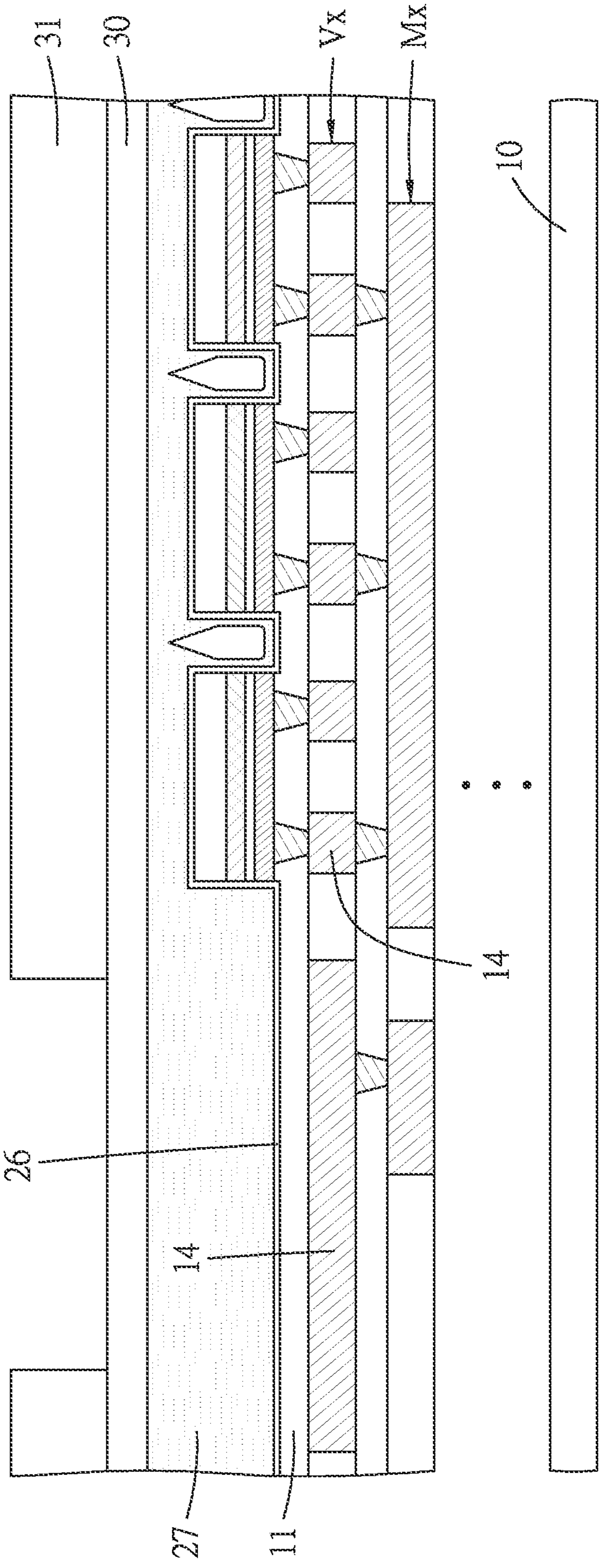

Referring to FIG. 1A and the example illustrated in FIG. 21, the method 100A proceeds to step S07, where a passivation layer 30 and a patterned photoresist layer 31 are formed. In some embodiments, the passivation layer 30 may be formed on the structure shown in FIG. 19 by a suitable deposition process as known to those skilled in the art of semiconductor fabrication, for example, but not limited to, CVD, PVD, ALD, HDPCVD, RPCVD, PECVD, or LPCVD. Other suitable techniques are within the contemplated scope of the present disclosure. In some embodiments, the passivation layer 30 is light-transmissive. In some embodiments, the passivation layer 30 includes for example, but not limited to, a nitride-based material (for example, but not limited to, silicon nitride (SiN)), an oxide-based material (for example, but not limited to, silicon oxide ($SiO_2$)), or a combination thereof. Other suitable materials are within the contemplated scope of the present disclosure. The patterned photoresist layer 31 may be formed on the passivation layer 30 using the materials and the processes for forming the patterned photoresist layer 12 described above with reference to FIG. 2, and the details thereof are omitted for the sake of brevity.

Figure 22:
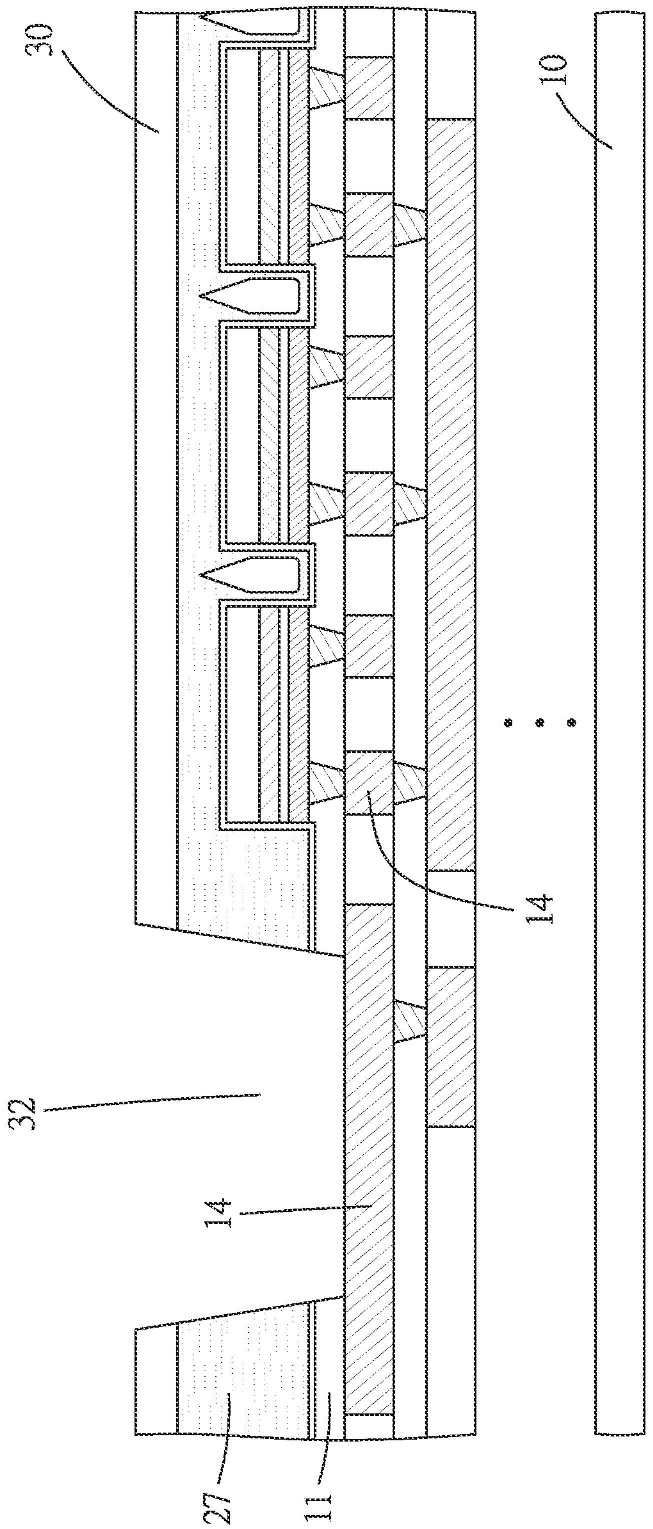

Referring to FIG. 1A and the example illustrated in FIG. 22, the method 100A proceeds to step S08, where one or more bond pad openings 32 is formed. One of the bond pad openings 32 is shown in FIG. 22. The passivation layer 30, the dielectric layer 27, the dielectric layer 26, and the dielectric layer 11 are patterned by one or more suitable etching processes as known to those skilled in the art of semiconductor fabrication, for example, but not limited to, dry etching, wet etching, a combination thereof, or other suitable etching processes, through the patterned photoresist layer 31 to form the one or more bond pad openings 32, such that one or more of the metal lines 14 are exposed through the one or more bond pad opening 32, respectively. The patterned photoresist layer 31 (see FIG. 21) is removed by a suitable removal technique (for example, but not limited to, a plasma treatment) after the one or more bond pad opening 32 are formed.

Figure 23:
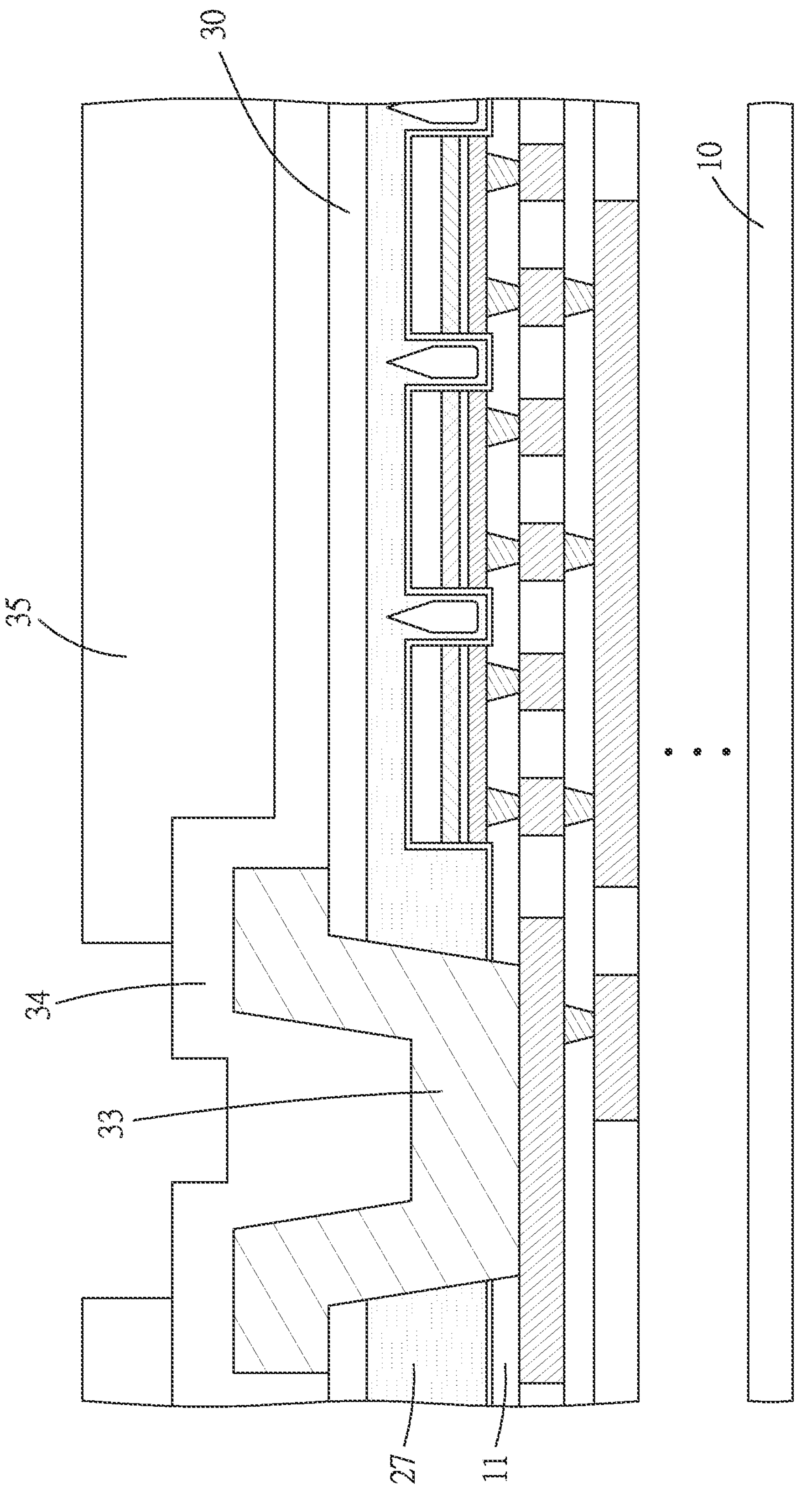

Referring to FIG. 1A and the example illustrated in FIG. 23, the method 100A proceeds to step S09, where one or more bond pads 33, a passivation layer 34, and a patterned photoresist layer 35 are formed. In some embodiments, the one or more bond pads 33 may be made of a metal (e.g., aluminum (Al)) or a metal alloy (e.g., aluminum copper (AlCu)). Other suitable materials are within the contemplated scope of the present disclosure. One of the bond pads 33 is shown in FIG. 23. In some embodiments, the one or more bond pads 33 may be formed by conformally depositing a layer of the metal or the metal alloy on the structure shown in FIG. 22, followed by a lithography process and a suitable etching process (for example, but not limited to, dry etching, wet etching, a combination thereof) as known to those skilled in the art of semiconductor fabrication. Thereafter, the passivation layer 34 is conformally formed using the materials and the processes for forming the passivation layer 30 described above with reference to FIG. 21, and thus details thereof are omitted for the sake of brevity. In some embodiments, the passivation layer 34 is light-transmissive. The passivation layer 34 covers the one or more bond pads 33 and the passivation layer 30. The patterned photoresist layer 35 is then formed on the passivation layer 34 using the materials and the processes described above for forming the patterned photoresist layer 12 described above with reference to FIG. 2, and the details thereof are omitted for the sake of brevity.

Figure 24:
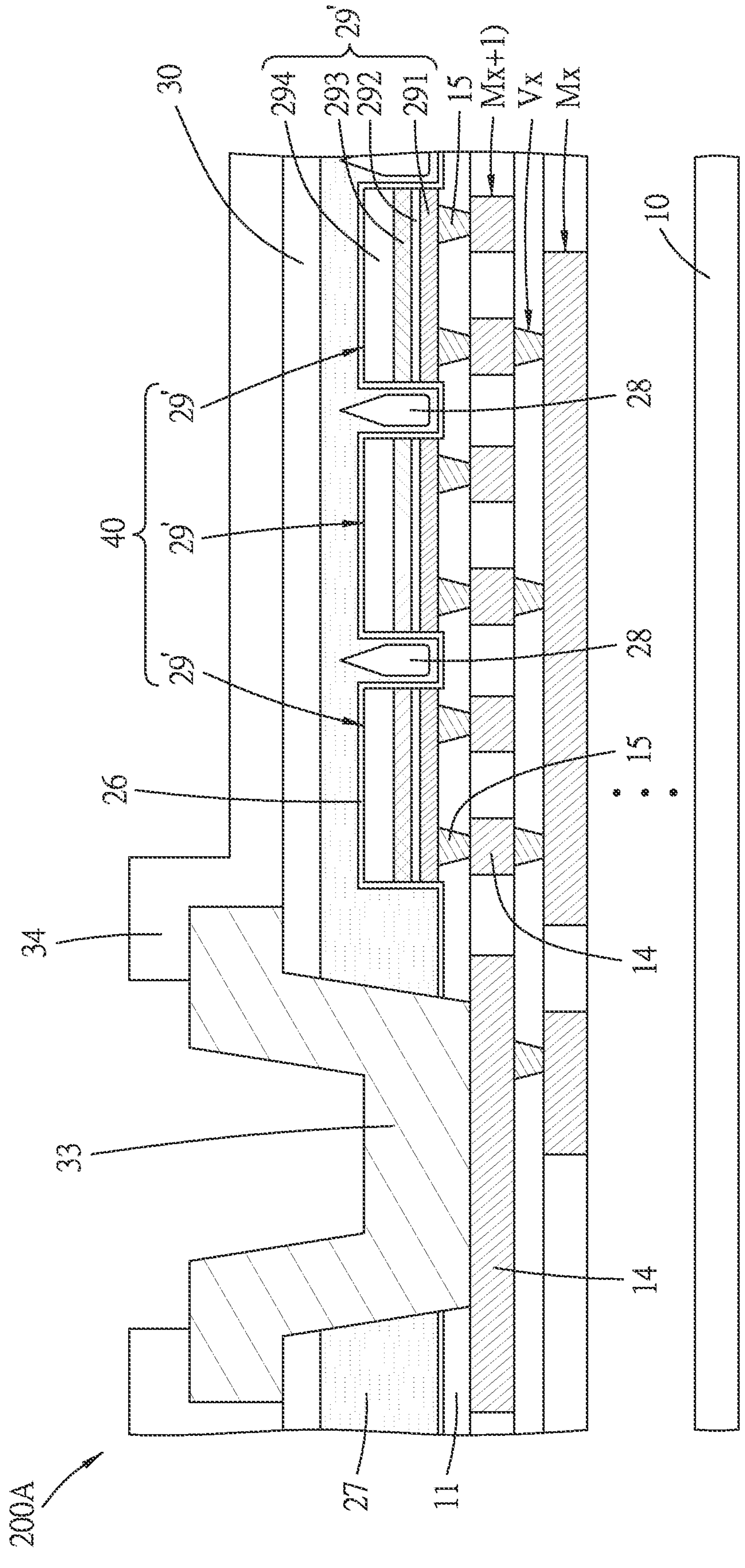

Referring to FIG. 1A and the example illustrated in FIG. 24, the method 100A proceeds to step S10, where the passivation layer 34 is patterned. In some embodiments, the passivation layer 34 is patterned by a suitable etching process as known to those skilled in the art of semiconductor fabrication, for example, but not limited to, dry etching, wet etching, a combination thereof, or other suitable etching processes, through the patterned photoresist layer 35 to expose the one or more bond pads 33. Thereafter, the patterned photoresist layer 35 (see FIG. 23) is removed by a suitable removal technique (for example, but not limited to, a plasma treatment). The semiconductor device 200 A is obtained accordingly.

Figure 25:
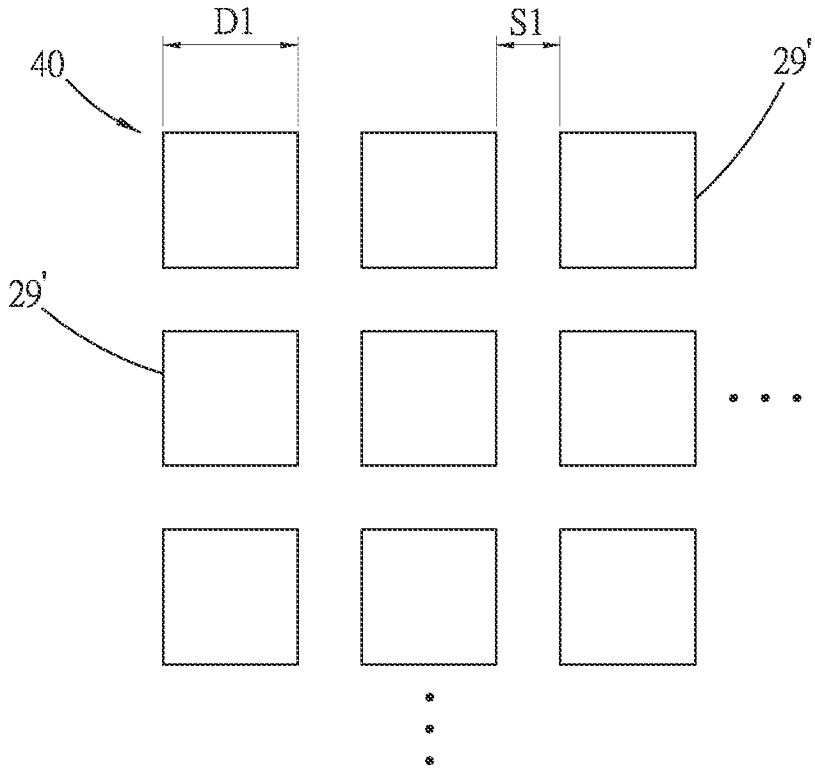

Referring to the examples illustrated in FIGS. 24 and 25, the semiconductor device 200A includes a spatial light modulator 40 disposed on the BEVAs 15. The spatial light modulator 40 includes a plurality of the pixels 29' configured by the stack portions 29'. In some embodiments, the pixels 29' are arranged in an array to form the spatial light modulator 40 which can be used for, for example, but not limited to, dynamic holography. Two adjacent ones of the pixels 29' are spaced apart from each other by a corresponding one of the air gaps 28. The air gaps 28 are used to provide better thermal confinement to the heater portion 291 of each of the pixels 29'. In some embodiments, each of the pixels 29' has a pixel size (DI) ranging from about 200 nm to about 500 nm. In some embodiments, two adjacent ones of the pixels 29' are spaced from each other by a spacing distance ranging from about 50 nm to about 100 nm. Therefore, a pixel pitch (i.e., a total of the pixel size and the spacing distance) of the spatial light modulator 40 can be reduced to a nanoscale size. In some embodiments, the pixel pitch of the spatial light modulator 40 is smaller than a half of a wavelength (450 nm) of blue light. In each of the pixels 29' of the spatial light modulator 40, the PCM portion 293 can be controlled by the heater portion 291 to undergo a crystalline-to-amorphous phase transition. That is, the PCM portion 293 can be switched between an amorphous state and a crystalline state through the control of the heater portion 291. When the PCM portion 293 is heated by the heater portion 291 with application of a current to the heater portion 291 through at least one of the BEVAs, it is switched to the amorphous state (a reset pulse). On the other hand, when the PCM portion 293 is not heated by the heater portion 291, it is switched to the crystalline state (a set pulse). Therefore, different absorption and phase delay of diffracted light will be produced by switching the PCM portion 293 between the amorphous state and the crystalline state so as to permit the spatial light modulator 40 to produce a holographic image. In addition, with use of the phase change material to form the PCM portion 293 of each of the pixels 29', the spatial light modulator 40 thus obtained has an increased field-of-view (FOV) and an improved resolution. In some embodiments, the spatial light modulator 40 including the pixels 29' with a pixel pitch of about 250 nm can have a FOV of about 60.

Referring to the example illustrated in FIG. 24, a via layer (Vx) and a metal layer (Mx) can be additionally formed in the semiconductor device 200A. The via layer (Vx) is disposed below the metal layer (Mx+1) opposite to the BEVAs 15. The metal layer (Mx) is disposed below the via layer (Vx) opposite to the metal layer (Mx+1). The metal layer (Mx+1), the via layer (Vx), and the metal layer (Mx), singly or in combination, can be referred to as an interconnect structure. The one or more bond pads 33 are isolated from the pixels 29' and are electrically connected to one or more of the metal lines 14 of the metal layer (Mx+1), respectively.

In a method for manufacturing a semiconductor device including a spatial light modulator in accordance with some embodiments of the present disclosure, a phase change material is used to form a phase change portion of each of pixels of the spatial light modulator, so that a pixel pitch can be reduced to a nanoscale size. In addition, air gaps are formed to isolate the pixels from each other so as to provide better thermal confinement to a heater portion of each of the pixels. Moreover, the spatial light modulator can be formed by a CMOS logic compatible process.

In accordance with some embodiments of the present disclosure, a method for manufacturing a semiconductor device includes: forming a first dielectric layer on a semiconductor substrate; forming a plurality of spaced-apart electrodes in the first dielectric layer; forming a patterned stack on the electrodes opposite to the semiconductor substrate, the patterned stack including a plurality of stack portions spaced apart from each other, each of the stack portions including a heater portion disposed on and connected to at least one of the electrodes and a phase change material portion disposed on the heater portion opposite to the at least one of the electrodes; forming a second dielectric layer to conformally cover the patterned stack; and forming a third dielectric layer on the second dielectric layer, the third dielectric layer being formed with a plurality of air gaps such that the stack portions are spaced apart from each other by the air gaps.

In accordance with some embodiments of the present disclosure, in formation of the patterned stack, a first dielectric spacer is formed between the heater portion and the phase change material portion and a second dielectric spacer is formed on the phase change material portion opposite to the first dielectric spacer.

In accordance with some embodiments of the present disclosure, formation of the patterned stack includes: forming a patterned heater layer on the electrodes; and after forming the patterned heater layer, forming a lower patterned dielectric layer on the patterned heater layer, forming a patterned phase change material layer on the lower patterned dielectric layer opposite to the patterned heater layer, and forming an upper patterned dielectric layer on the patterned phase change material layer opposite to the lower patterned dielectric layer.

In accordance with some embodiments of the present disclosure, formation of the patterned heater layer includes: forming a heater material layer on the electrodes; patterning the heater material layer to form the patterned heater layer; forming a fourth dielectric layer on the first dielectric layer to cover the patterned heater layer; and removing a portion of the fourth dielectric layer such that the patterned heater layer is disposed in remainder of the fourth dielectric layer.

In accordance with some embodiments of the present disclosure, formation of the lower patterned dielectric layer, the patterned phase change material layer, and the upper patterned dielectric layer includes: forming a fifth dielectric layer on the remainder of the fourth dielectric layer and the patterned heater layer; forming a phase change material layer on the fifth dielectric layer; forming a sixth dielectric layer on the phase change material layer opposite to the fifth dielectric layer; and patterning the fifth dielectric layer, the phase change material layer, and the sixth dielectric layer so as to form the fifth dielectric layer into the lower patterned dielectric layer, to form the phase change material layer into the patterned phase change material layer, and to form the sixth dielectric layer into the upper patterned dielectric layer.

In accordance with some embodiments of the present disclosure, formation of the patterned stack includes: forming a heater material layer on the electrodes; forming a fourth dielectric layer on the heater material layer opposite to the electrodes; forming a phase change material layer on the fourth dielectric layer opposite to the heater material layer; forming a fifth dielectric layer on the phase change material layer opposite to the fourth dielectric layer; and patterning the heater material layer, the fourth dielectric layer, the phase change material layer, and the fifth dielectric layer so as to form the heater material layer into the patterned heater layer, to form the fourth dielectric layer into the lower patterned dielectric layer, to form the phase change material layer into the patterned phase change material layer, and to form the fifth dielectric layer into the upper patterned dielectric layer.

In accordance with some embodiments of the present disclosure, the method for manufacturing a semiconductor device further includes: forming an interconnect structure below the electrodes, the interconnect structure including a plurality of spaced-apart conductive interconnects, such that at least one of the electrodes is connected to at least one of the conductive interconnects, respectively; and forming a bond pad which is spaced apart from one of the stack portions adjacent to the bond pad and which is connected to a corresponding one of the conductive interconnects.

In accordance with some embodiments of the present disclosure, a method for manufacturing a semiconductor device includes: forming a first dielectric layer on a semiconductor substrate; forming a plurality of spaced-apart electrodes in the first dielectric layer; forming a patterned stack on the electrodes opposite to the semiconductor substrate, the patterned stack including a patterned heater layer disposed on and connected to the electrodes and a patterned phase change material layer disposed on the patterned heater layer opposite to the electrodes; forming a second dielectric layer to conformally cover the patterned stack; and forming a third dielectric layer on the second dielectric layer, the third dielectric layer being formed with a plurality of air gaps.

In accordance with some embodiments of the present disclosure, the patterned stack includes a plurality of stack portions spaced apart from each other, and the air gaps are formed in the patterned stack such that the stack portions are spaced apart from each other by the air gaps.

In accordance with some embodiments of the present disclosure, in formation of the patterned stack, a lower patterned dielectric layer is formed between the patterned heater layer and the patterned phase change material layer and an upper patterned dielectric layer is formed on the patterned phase change material layer opposite to the lower patterned dielectric layer.

In accordance with some embodiments of the present disclosure, formation of the patterned stack includes: forming the patterned heater layer on the electrodes; and after forming the patterned heater layer, forming the lower patterned dielectric layer on the patterned heater layer, forming the patterned phase change material layer on the lower patterned dielectric layer opposite to the patterned heater layer, and forming the upper patterned dielectric layer on the patterned phase change material layer opposite to the lower patterned dielectric layer.

In accordance with some embodiments of the present disclosure, formation of the patterned heater layer includes: forming a heater material layer on the electrodes; patterning the heater material layer to form the patterned heater layer; forming a fourth dielectric layer on the first dielectric layer to cover the patterned heater layer; and removing a portion of the fourth dielectric layer such that the patterned heater layer is disposed in remainder of the fourth dielectric layer.

In accordance with some embodiments of the present disclosure, formation of the lower patterned dielectric layer, the patterned phase change material layer, and the upper patterned dielectric layer includes: forming a fifth dielectric layer on the remainder of the fourth dielectric layer and the patterned heater layer; forming a phase change material layer on the fifth dielectric layer; forming a sixth dielectric layer on the phase change material layer opposite to the fifth dielectric layer; and patterning the fifth dielectric layer, the phase change material layer, and the sixth dielectric layer so as to form the fifth dielectric layer into the lower patterned dielectric layer, to form the phase change material layer into the patterned phase change material layer, and to form the sixth dielectric layer into the upper patterned dielectric layer.

In accordance with some embodiments of the present disclosure, formation of the patterned stack includes: forming a heater material layer on the electrodes; forming a fourth dielectric layer on the heater material layer opposite to the electrodes; forming a phase change material layer on the fourth dielectric layer opposite to the heater material layer; forming a fifth dielectric layer on the phase change material layer opposite to the fourth dielectric layer; and patterning the heater material layer, the fourth dielectric layer, the phase change material layer, the fifth dielectric layer so as to form the heater material layer into the patterned heater layer, to form the fourth dielectric layer into the lower patterned dielectric layer, to form the phase change material layer into the patterned phase change material layer, and to form the fifth dielectric layer into the upper patterned dielectric layer.

In accordance with some embodiments of the present disclosure, the method for manufacturing a semiconductor device further includes: forming an interconnect structure below the electrodes, the interconnect structure including a plurality of spaced-apart conductive interconnects, such that at least one of the electrodes is connected to at least one of the conductive interconnects, respectively; and forming a bond pad which is spaced apart from one of the stack portions adjacent to the bond pad and which is connected to a corresponding one of the conductive interconnects.

In accordance with some embodiments of the present disclosure, a semiconductor device includes a semiconductor substrate, a first dielectric layer, a plurality of spaced-apart electrodes, a spatial light modulator, and a second dielectric layer. The first dielectric layer is disposed on the semiconductor substrate. The spatial light modulator is disposed on the electrodes and the first dielectric layer, and includes a plurality of pixels spaced apart from each other. The second dielectric layer is disposed to conformally cover the pixels. Each of the pixels includes a stack portion, which includes a heater portion disposed on and connected to at least one of the electrodes and a phase change material portion disposed on the heater portion opposite to the at least one of the electrodes.

In accordance with some embodiments of the present disclosure, the semiconductor device further includes a third dielectric layer formed on the second dielectric layer. The third dielectric layer includes a plurality of air gaps such that the pixels are spaced apart from each other by the air gaps.

In accordance with some embodiments of the present disclosure, the stack portion further includes a first dielectric spacer disposed between the heater portion and the phase change material portion and a second dielectric spacer disposed on the phase change material portion opposite to the first dielectric spacer.

In accordance with some embodiments of the present disclosure, the semiconductor device further includes an interconnect structure and a bond pad. The interconnect structure is disposed below the electrodes, and includes a plurality of spaced-apart conductive interconnects, such that at least one of the electrodes is connected to at least one of the conductive interconnects, respectively. The bond pad is disposed to be spaced apart from one of the stack portions adjacent to the bond pad and is connected to a corresponding one of the conductive interconnects.

In accordance with some embodiments of the present disclosure, each of the pixels has a pixel size ranging from 200 nm to 500 nm, and two adjacent ones of the pixels are spaced apart from each other by a spacing distance ranging from 50 nm to 100 nm.

The foregoing outlines features of several embodiments so that those skilled in the art may better understand the aspects of the present disclosure. Those skilled in the art should appreciate that they may readily use the present disclosure as a basis for designing or modifying other processes or structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for manufacturing a semiconductor device, comprising:

forming a first dielectric layer on a semiconductor substrate;

forming a plurality of spaced-apart electrodes in the first dielectric layer;

forming a patterned stack on the plurality of spaced-apart electrodes opposite to the semiconductor substrate, the patterned stack including a plurality of stack portions spaced apart from each other, each of the plurality of stack portions including a heater portion disposed on and connected to at least one of the plurality of spaced-apart electrodes and a phase change material portion disposed on the heater portion opposite to the at least one of the plurality of spaced-apart electrodes;

conformally depositing a second dielectric layer on the patterned stack such that the heater portion and the phase change material portion are covered by the second dielectric layer; and forming a third dielectric layer on the second dielectric layer such that the third dielectric layer is formed with a plurality of air gaps and such that the plurality of stack portions are spaced apart from each other by the plurality of air gaps.

2. The method as claimed in claim 1, wherein in formation of the patterned stack, a first dielectric spacer is formed in a manner such that the dielectric spacer is sandwiched between the heater portion and the phase change material portion.

3. The method as claimed in claim 2, wherein formation of the patterned stack includes:

forming a patterned heater layer on the plurality of spaced-apart electrodes; and after forming the patterned heater layer, forming a lower patterned dielectric layer on the patterned heater layer, forming a patterned phase change material layer on the lower patterned dielectric layer opposite to the patterned heater layer, and forming an upper patterned dielectric layer on the patterned phase change material layer opposite to the lower patterned dielectric layer.

4. The method as claimed in claim 3, wherein formation of the patterned heater layer includes:

forming a heater material layer on the plurality of spaced-apart electrodes;

patterning the heater material layer to form the patterned heater layer;

forming a fourth dielectric layer on the first dielectric layer to cover the patterned heater layer; and removing a portion of the fourth dielectric layer such that the patterned heater layer is disposed in remainder of the fourth dielectric layer.

5. The method as claimed in claim 4, wherein formation of the lower patterned dielectric layer, the patterned phase change material layer, and the upper patterned dielectric layer includes:

forming a fifth dielectric layer on the remainder of the fourth dielectric layer and the patterned heater layer;

forming a phase change material layer on the fifth dielectric layer;

forming a sixth dielectric layer on the phase change material layer opposite to the fifth dielectric layer; and patterning the fifth dielectric layer, the phase change material layer, and the sixth dielectric layer so as to form the fifth dielectric layer into the lower patterned dielectric layer, to form the phase change material layer into the patterned phase change material layer, and to form the sixth dielectric layer into the upper patterned dielectric layer.

6. The method as claimed in claim 2, wherein formation of the patterned stack includes:

forming a heater material layer on the plurality of spaced-apart electrodes;

forming a fourth dielectric layer on the heater material layer opposite to the plurality of spaced-apart electrodes;

forming a phase change material layer on the fourth dielectric layer opposite to the heater material layer;

forming a fifth dielectric layer on the phase change material layer opposite to the fourth dielectric layer; and patterning the heater material layer, the fourth dielectric layer, the phase change material layer, and the fifth dielectric layer so as to form the heater material layer into the patterned heater layer, to form the fourth dielectric layer into the lower patterned dielectric layer, to form the phase change material layer into the patterned phase change material layer, and to form the fifth dielectric layer into the upper patterned dielectric layer.

7. The method as claimed in claim 1, further comprising:

forming an interconnect structure below the plurality of spaced-apart electrodes, the interconnect structure including a plurality of spaced-apart conductive interconnects, such that at least one of the plurality of spaced-apart electrodes is connected to at least one of the plurality of spaced-apart conductive interconnects, respectively; and forming a bond pad which is spaced apart from one of the plurality of stack portions adjacent to the bond pad and which is connected to a corresponding one of the plurality of spaced-apart conductive interconnects.

8. A method for manufacturing a semiconductor device, comprising:

forming a first dielectric layer on a semiconductor substrate;

forming a plurality of spaced-apart electrodes in the first dielectric layer;

forming a patterned stack on the plurality of spaced-apart electrodes opposite to the semiconductor substrate, the patterned stack including a patterned heater layer disposed on and connected to the plurality of spaced-apart electrodes and a patterned phase change material layer disposed on the patterned heater layer opposite to the plurality of spaced-apart electrodes, wherein the patterned phase change material layer is free of directly contacting the patterned heater layer;

forming a second dielectric layer to conformally cover the patterned stack; and forming a third dielectric layer on the second dielectric layer such that the third dielectric layer is formed with a plurality of air gaps.

9. The method as claimed in claim 8, wherein:

the patterned stack includes a plurality of stack portions spaced apart from each other; and the plurality of air gaps are formed in the patterned stack such that the plurality of stack portions are spaced apart from each other by the plurality of air gaps.

10. The method as claimed in claim 8, wherein in formation of the patterned stack, a lower patterned dielectric layer is sandwiched between the patterned heater layer and the patterned phase change material layer and an upper patterned dielectric layer is formed on the patterned phase change material layer opposite to the lower patterned dielectric layer.

11. The method as claimed in claim 10, wherein formation of the patterned stack includes:

forming the patterned heater layer on the plurality of spaced-apart electrodes; and after forming the patterned heater layer, forming the lower patterned dielectric layer on the patterned heater layer, forming the patterned phase change material layer on the lower patterned dielectric layer opposite to the patterned heater layer, and forming the upper patterned dielectric layer on the patterned phase change material layer opposite to the lower patterned dielectric layer, wherein the upper patterned dielectric layer is free of directly contacting the lower patterned dielectric layer.

12. The method as claimed in claim 11, wherein formation of the patterned heater layer includes:

forming a heater material layer on the plurality of spaced-apart electrodes;

patterning the heater material layer to form the patterned heater layer;

forming a fourth dielectric layer on the first dielectric layer to cover the patterned heater layer; and removing a portion of the fourth dielectric layer such that the patterned heater layer is disposed in remainder of the fourth dielectric layer.

13. The method as claimed in claim 12, wherein formation of the lower patterned dielectric layer, the patterned phase change material layer, and the upper patterned dielectric layer includes:

forming a fifth dielectric layer on the remainder of the fourth dielectric layer and the patterned heater layer;

forming a phase change material layer on the fifth dielectric layer;

forming a sixth dielectric layer on the phase change material layer opposite to the fifth dielectric layer; and patterning the fifth dielectric layer, the phase change material layer, and the sixth dielectric layer so as to form the fifth dielectric layer into the lower patterned dielectric layer, to form the phase change material layer into the patterned phase change material layer, and to form the sixth dielectric layer into the upper patterned dielectric layer.

14. The method as claimed in claim 10, wherein formation of the patterned stack includes:

forming a heater material layer on the plurality of spaced-apart electrodes;

forming a fourth dielectric layer on the heater material layer opposite to the plurality of spaced-apart electrodes;

forming a phase change material layer on the fourth dielectric layer opposite to the heater material layer;

forming a fifth dielectric layer on the phase change material layer opposite to the fourth dielectric layer; and patterning the heater material layer, the fourth dielectric layer, the phase change material layer, the fifth dielectric layer so as to form the heater material layer into the patterned heater layer, to form the fourth dielectric layer into the lower patterned dielectric layer, to form the phase change material layer into the patterned phase change material layer, and to form the fifth dielectric layer into the upper patterned dielectric layer.

15. The method as claimed in claim 9, further comprising:

forming an interconnect structure below the plurality of spaced-apart electrodes, the interconnect structure including a plurality of spaced-apart conductive interconnects, such that at least one of the plurality of spaced-apart electrodes is connected to at least one of the plurality of spaced-apart conductive interconnects, respectively; and forming a bond pad which is spaced apart from one of the plurality of stack portions adjacent to the bond pad and which is connected to a corresponding one of the plurality of spaced-apart conductive interconnects.

16. A semiconductor device, comprising:

a semiconductor substrate;

a first dielectric layer disposed on the semiconductor substrate;

a plurality of spaced-apart electrodes disposed in the first dielectric layer;

a spatial light modulator disposed on the plurality of spaced-apart electrodes and the first dielectric layer, the spatial light modulator including a plurality of pixels spaced apart from each other; and a second dielectric layer disposed to conformally cover the plurality of pixels, each of the plurality of pixels including a stack portion, which includes a heater portion disposed on and connected to at least one of the plurality of spaced-apart electrodes and a phase change material portion disposed on the heater portion opposite to the at least one of the plurality of spaced-apart electrodes, wherein the heater portion is free of directly contacting the phase change material portion.

17. The semiconductor device as claimed in claim 16, further comprising a third dielectric layer formed on the second dielectric layer, the third dielectric layer including a plurality of air gaps such that the plurality of pixels are spaced apart from each other by the plurality of air gaps.

18. The semiconductor device as claimed in claim 16, wherein the stack portion further includes a first dielectric spacer sandwiched between the heater portion and the phase change material portion and a second dielectric spacer disposed on the phase change material portion opposite to the first dielectric spacer.

19. The semiconductor device as claimed in claim 16, further comprising:

an interconnect structure disposed below the plurality of spaced-apart electrodes, the interconnect structure including a plurality of spaced-apart conductive interconnects, such that at least one of the plurality of spaced-apart electrodes is connected to at least one of the plurality of spaced-apart conductive interconnects, respectively; and a bond pad which is disposed to be spaced apart from one of the plurality of stack portions adjacent to the bond pad and which is connected to a corresponding one of the plurality of spaced-apart conductive interconnects.

20. The semiconductor device as claimed in claim 16, wherein each of the plurality of pixels has a pixel size ranging from 200 nm to 500 nm, and two adjacent ones of the plurality of pixels are spaced apart from each other by a spacing distance ranging from 50 nm to 100 nm.

* * * * *